US012095086B2

(12) United States Patent
Barboux et al.

(10) Patent No.: US 12,095,086 B2
(45) Date of Patent: Sep. 17, 2024

(54) NEGATIVE ELECTRODE ACTIVE MATERIAL BASED ON IRON AND LITHIUM HYDROXYSULFIDE

(71) Applicants: RENAULT s.a.s, Boulogne Billancourt (FR); CENTRE NATIONAL DE LA RECHERCHE SCIENTIFIQUE (CNRS), Paris (FR); Ecole Nationale Superieure de Chimie de Paris, Paris (FR)

(72) Inventors: Philippe Barboux, L'Hay les Roses (FR); Mohamed Chakir, Saint-Germain les Arpajon (FR); Domitille Giaume, Paris (FR); Caroline Mir, Pantin (FR)

(73) Assignees: RENAULT s.a.s., Boulogne Billancourt (FR); CENTRE NATIONAL DE LA RECHERCHE SCIENTIFIQUE (CNRS), Paris (FR); Ecole Nationale Superieure de Chimie de Paris, Paris (FR)

( * ) Notice: Subject to any disclaimer, the term of this patent is extended or adjusted under 35 U.S.C. 154(b) by 0 days.

(21) Appl. No.: 17/415,363

(22) PCT Filed: Dec. 18, 2019

(86) PCT No.: PCT/EP2019/085857
§ 371 (c)(1),
(2) Date: Jun. 17, 2021

(87) PCT Pub. No.: WO2020/127427
PCT Pub. Date: Jun. 25, 2020

(65) Prior Publication Data
US 2022/0069306 A1    Mar. 3, 2022

(30) Foreign Application Priority Data
Dec. 18, 2018  (FR) ..................... 1873243

(51) Int. Cl.
| H01M 4/131 | (2010.01) |
| C01G 49/00 | (2006.01) |
| H01M 4/136 | (2010.01) |
| H01M 4/139 | (2010.01) |
| H01M 4/58 | (2010.01) |
| H01M 4/62 | (2006.01) |
| H01M 10/0525 | (2010.01) |
| H01M 4/02 | (2006.01) |

(52) U.S. Cl.
CPC ........ *H01M 4/5815* (2013.01); *C01G 49/009* (2013.01); *H01M 4/136* (2013.01); *H01M 4/625* (2013.01); *H01M 10/0525* (2013.01); *C01P 2006/40* (2013.01); *H01M 2004/027* (2013.01)

(58) Field of Classification Search
CPC .... H01M 4/5815; H01M 4/136; H01M 4/625; H01M 10/0525; H01M 2004/027; H01M 4/13; H01M 4/131; H01M 4/133; H01M 4/139; H01M 4/1391; H01M 4/1393; C01G 49/009; C01P 2006/40
See application file for complete search history.

(56) References Cited

FOREIGN PATENT DOCUMENTS

JP    2014-17157 A    1/2014

OTHER PUBLICATIONS

Superconductivity in LiOHFeS single crystals with a shrunk c-axis lattice constant, H. Lin, et al. Sci. China-Phys. Mech. Astron. (Feb. 2017) vol. 60 No. 2.*
Effect of hydrothermal conditions on superconductivity and magnetism in [Li1—xFexOH]FeS, E. McDonnell et al., Materials Chemistry and Physics 217 (2018) 451-456.*
Superconductivity and magnetism in iron sulfides intercalated by metal hydroxides, Zhou et al., Chem. Sci., 2017, 8, 3781-3788.*
A facile method to prepare FeS/porous carbon composite as advanced anode material for lithium-ion batteries, Guo et al, J Mater Sci (2017) 52:2345-2355.*
Reddy, M. A. et al., "Monoclinic iron hydroxyl sulphate: A new route to electrode materials", Sep. 2009, Electrochemistry Communications, Elsevier, Amsterdam, NL, vol. 11, No. 9, pp. 1807-1810, [retrieved on Jul. 21, 2009], XP026716407.
Manohar, A.K. et al., "The Role of Sulfide Additives in Achieving Long Cycle Life Rechargeable Iron Electrodes in Alkaline Batteries", Journal of the Electrochemical Society, Jan. 1, 2015; vol. 162, No. 9, pp. A1864-A1872 XP055630572.
International Search Report mailed on Apr. 24, 2020 in PCT/EP2019/085857 filed on Dec. 18, 2019 (2 pages).

* cited by examiner

*Primary Examiner* — Haidung D Nguyen
(74) *Attorney, Agent, or Firm* — Oblon, McClelland, Maier & Neustadt, L.L.P.

(57) ABSTRACT

A negative electrode active material for a lithium-ion battery has the following formula (I): Li1-xOHFe1+xS (I). x varies from 0.00 to 0.25, preferably from 0.05 to 0.20.

19 Claims, 2 Drawing Sheets

NEGATIVE ELECTRODE ACTIVE MATERIAL BASED ON IRON AND LITHIUM HYDROXYSULFIDE

The invention relates to the general field of lithium-ion (Li-ion) rechargeable batteries. The invention relates more specifically to negative electrode materials for Li-ion batteries and the negative electrodes of which they are comprised. The invention also relates to a method for making active electrode material.

Conventionally, Li-ion batteries comprise one or more positive electrodes, one or more negative electrodes, an electrolyte, and a separator.

In addition, Li-ion batteries are increasingly being used as an autonomous power source, particularly in applications having to do with electric mobility. This trend is explained by energy densities in terms of mass and volume that are markedly greater than those of conventional nickel-cadmium (Ni—Cd) and nickel-metal hydride (Ni—MH) batteries, the absence of a memory effect, minimal self-discharge compared to other batteries, and also a drop in the cost per kilowatt-hour associated with this technology.

Li-ion batteries comprise electrode active materials allowing for the insertion and deinsertion of lithium ions during the charging and discharging processes. These insertions and deinsertions must be reversible so that the battery can store energy over a plurality of cycles.

Good mobility of the lithium ion within the structure and good electrical conductivity of the electrode material are essential properties making it possible to use these batteries at high charge and discharge rates, thus enabling high electrical power. The specific power of a battery is an important aspect for automotive applications, because it makes it possible to use lighter batteries for the same amount of force, or it makes it possible to use batteries under more secure conditions.

Sulphide-based electrode materials were developed at the end of the 1970s. It was assumed that the strong covalence of sulphides gave them good mobility of the lithium ion and good electron mobility, thus ensuring good electrical conductivity. A lot of transition metal sulphides ($MOS_2$, $TiS_2$) have lamellar structures with foils between which the lithium can quickly diffuse in a large quantity, thus affording the compound a good capacity (number of lithium ions or charges that can be inserted per unit of electrode mass expressed as mAh).

However, a drawback of sulphides is linked to the mass of sulphur. In addition, the soft nature (in a mechanical sense) of these compounds, which are greatly deformed during lithium insertion-deinsertion, often causes a mechanical ageing and swelling of the batteries. Furthermore, these compounds are free of lithium and the battery must be manufactured in conjunction with metallic lithium or a lithiated compound with low potential, often very unstable in air (i.e. $LiC_6$).

In the early 1980s, oxides already containing lithium were therefore proposed as a replacement for sulphides. These compounds are now commonly used in current batteries. The primary compounds are lamellar oxides, for example $LiCoO_2$, LCO, three-dimensional oxides derived from spinel structures (for example $LiM_2O_4$, LMO) and olivine structures ($LiFePO_4$, LFP).

In light of these previously-lithiated oxides, negative electrode active materials must have a low insertion potential in relation to lithium and be capable of inserting lithium. The most widely known is graphite, but of the other commonly used materials, let us mention the oxide $Li_4Ti_5O_{12}$ (LTO) which has a theoretical capacity of 175 mAh/g and an oxidation-reduction potential of 1.5V, as mentioned in "Ti-based compounds as anode materials for Li-ion batteries," Zhu, G. N., Wang, Y. G., Xia, Y. Y., *Energy & Environmental Science*, 5(5), 6652-6667, 2012. This active material has a high stability through cycling, which makes it attractive despite its limited energy density compared to graphite. Furthermore, it initially has an insulating characteristic, making it mandatory to add a conductive compound to the negative electrode.

There is consequently a need to develop new negative electrode active materials making it possible to overcome the drawbacks mentioned above in connection with using the oxide LTO.

It has been discovered that a particular negative electrode active material based on lithium and iron hydroxysulfide yielded an improved capacity and an improved conductivity.

Therefore, the invention relates to a negative electrode active material for a lithium-ion battery having the following formula:

$$Li_{1-x}OHFe_{1+x}S \qquad (I),$$

wherein x varies from 0.00 to 0.25, preferably from 0.05 to 0.20.

The invention further relates to a method for preparing the active material according to the invention. The invention also relates to a negative electrode comprising the active material according to the invention. The invention also relates to a Li-ion battery comprising at least one negative electrode according to the invention.

Other advantages and features of the invention will become clear from the detailed description and the appended drawings, in which.

Figure 1:
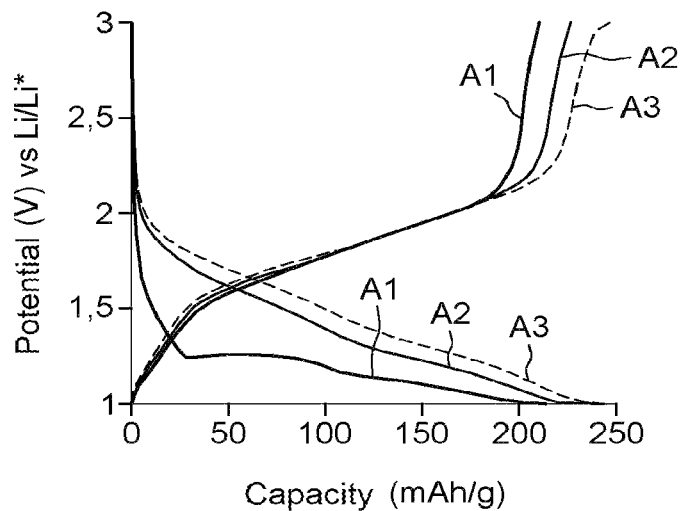
FIG. 1 is a graph showing the potential of a half cell of a Li-ion battery as a function of the quantity of electrochemically inserted lithium, expressed as a capacity.

It is specified that the expression "from . . . to" used in this description of the invention must be understood as including each of the indicated endpoints.

The initial composition (after synthesis) of the negative electrode active material for a lithium-ion battery according to the invention satisfies the formula (I) as mentioned above.

Preferably, x is equal to 0.05. Consequently, the active electrode material satisfies the formula $Li_{0.95}OHFe_{1.05}S$.

Advantageously, the active material according to the invention occurs in the form of plates having lateral dimensions ranging from 0.5 to 3 µm and a thickness ranging from 90 to 110 nm.

The invention also relates to a method for preparing the active material according to the invention, comprising the following steps:

(a) adding iron and sulphur in an aqueous solution of LiOH at a concentration ranging from 2 to 6 mol/L, preferably from 4 to 6 mol/L;

(b) heating the mixture obtained upon completion of step (a) to a temperature ranging from 130 to 190° C.;

(c) recovering said active material.

Advantageously, the iron is in the form of an iron powder.

When the quantity of lithium exceeds the saturation concentration (about 5 mol/L at 20° C.), a portion of the hydroxide is solid.

According to a preferred embodiment, step (b) is followed by a cooling, filtration, and drying step. Then, after the drying, the resulting product can be ground.

The invention further relates to a negative electrode comprising the active material according to the invention.

In a preferred way, the negative electrode according to the invention further comprises at least one conductive compound. So, in this embodiment, the electrode according to the invention can comprise the active material according to the invention and at least one conductive compound.

According to a particular embodiment, the conductive compound is chosen from among the metal particles, carbon, and the mixtures thereof, preferably carbon.

The carbon can be in the form of graphite, carbon black, carbon fibres, carbon nanowires, carbon nanotubes, carbon nanospheres, preferably carbon black.

In particular, the negative electrode according to the invention advantageously comprises SuperC65® carbon black marketed by Timcal.

In a preferred way, the content of active material according to the invention varies from 50 to 97% by weight, preferably from 70 to 97% by weight, more preferably from 80 to 97% by weight in relation to the total weight of the negative electrode.

Advantageously, the content of conductive compound varies from 3 to 30% by weight, preferably from 3 to 20% by weight, in relation to the total weight of the negative electrode.

According to an especially preferred embodiment, the content of active material varies from 70 to 97% by weight and the content of conductive compound varies from 3 to 30% by weight, in relation to the total weight of the negative electrode.

The present invention can also relate to a Li-ion battery cell comprising a negative electrode comprising the active material according to the invention, a positive electrode, a separator, and a electrolyte.

Preferably, the battery cell comprises a localized separator between the electrodes serving as an electrical insulator. Several materials may be used as separators. The separators are generally composed of porous polymers, preferably polyethylene and/or polypropylene. They can also be made of glass microfibres.

Advantageously, the separator used is a separator made of glass microfibres, CAT No. 1823-070® marketed by Whatman.

Preferably, said electrolyte is a liquid.

This electrolyte may comprise one or more lithium salts and one or more solvents.

The lithium salt or salts generally comprise inert anions. Appropriate lithium salts can be chosen from lithium bis [(trifluoromethyl)sulfonyl]imide ($LiN(CF_3SO_2)_2$), lithium trifluoromethane sulfonate ($LiCF_3SO_3$), lithium bis(oxalato) borate (LiBOB), lithium difluoro(oxalato) borate (LiDFOB), lithium bis(perfluoroethylsulfonyl)imide ($LiN(CF_3CF_2SO_2)_2$), $LiClO_4$, $LiAsF_6$, $LiPF_6$, $LiBF_4$, $LiI$, $LiCH_3SO_3$, $LiB(C_2O_4)_2$, $LiN(R_FSO_2)_2$, $LiC(R_FSO_2)_3$, wherein $R_F$ is a group chosen from a fluorine atom and a perfluoroalkyl group comprising one to eight carbon atoms.

The lithium salt or salts are preferably dissolved in one or more solvents chosen from the polar aprotic solvents, for example ethylene carbonate (noted "EC"), propylene carbonate, dimethyl carbonate, diethyl carbonate (noted "DEC"), methyl and ethyl carbonate, 1,3-dioxolane, and dimethoxyethane, as well as all mixtures of these various solvents.

Advantageously, the electrolyte comprises an equivolume mixture of ethylene carbonate and diethyl carbonate with the lithium salt $LiPF_6$ at 1M.

One object of the present invention is also a Li-ion battery comprising at least one negative electrode according to the invention.

The present invention also relates to the use of a material with the following formula (I):

$$Li_{1-x}OHFe_{1+x}S \qquad (I),$$

wherein x varies from 0.00 to 0.25, preferably from 0.05 to 0.20, as a negative electrode active material for a lithium-ion battery.

In a particularly preferred way, x is equal to 0.05.

The present invention is illustrated in a non-limiting way by the following examples.

EXAMPLES

I. Preparation of Electrochemical Half-Cells

1. Synthesis of the Active Materials
Synthesis of the Active Material $Li_{0.95}OHFe_{1.05}S$ 1.117 g of iron powder and 0.64 g of sulphur are added to 30 ml a LiOH solution (equivalent to 6 mol/L in concentration). This combination is placed in a 40-mL autoclave and is heated without stirring to 160° C. for 14 h in a closed enclosure withstanding pressure. After cooling, a black precipitate is observed and is then filtered and dried for 4 h at 90° C. in a dry nitrogen atmosphere. After this drying, the product is ground and a fine powder is obtained (the yield is about 80% by weight).

2. Preparation of the Active Material Electrodes (Negative Electrodes)

From material, two active material electrodes were prepared called EN-A and EN-B, respectively.

2.1 Preparation of Electrode EN-A

The active material electrodes is made by mixing 80% by weight of active material of formula $Li_{0.95}OHFe_{1.05}S$ and 20% by weight of SuperC65® carbon black, and the mixture is then ground by hand in an agate mortar.

2.2 Preparation of Electrode EN-B

The negative electrode is made of only the active material of formula $Li_{0.95}OHFe_{1.05}S$.

3. Assembling the Electrochemical Half-Cells

Two electrochemical half-cells were then prepared comprising the negative electrodes EN-A and EN-B, respectively. The half-cells were called DC-A and DC-B, respectively.

Assembling the electrochemical half-cells is done in a glove box with the help of a device consisting of a 12-mm-diameter Swagelok® fitting. Each half-cell comprises a separator, a positive electrode, and an electrolyte.

3.1 Assembling Half-Cell DC-A
Active Material Electrode

A weight of 25 mg of electrode EN-A, in the form of a powder, is then spread over a stainless steel piston placed in electrochemical half-cell DC-A.

Separator

Two layers of glass microfibre separator, CAT No. 1823-070®, are used to avoid any short-circuiting between the positive electrode and the negative electrode during the charge and discharge cycles. These separators are cut out according to a diameter of 12 mm and a thickness of 1 mm, and are deposited on the powder constituting the negative electrode.

Counter-Electrode Made of Lithium

Pellets measuring 12 mm in diameter are cut out from a sheet of lithium metal. The resulting pellet is then made to adhere to a stainless steel current collector by pressure. This collector is then deposited on the separating membrane in the cell.

Electrolyte

The electrolyte used comprises a commercial solution composed of $LiPF_6$ dissolved at a concentration of 1 mol/L in an equivolume mixture of ethylene carbonate and diethyl carbonate. A second piston is put into the cell to ensure a seal and allow for electrical contact with the active material electrode.

3.2 Assembling Half-Cell DC-B

Active Material Electrode

A weight of 25 mg of electrode EN-B, in the form of a powder, is then spread over a stainless steel piston placed in electrochemical half-cell DC-B.

The separator, lithium counter-electrode, and electrolyte are identical to those used in half-cell DC-A.

II. Electrochemical Tests

1. Half-Cell DC-A

Galvanostatic cycling is conducted using a BioLogic cycler with a cycling regimen of C/10, with C corresponding to the current for inserting one lithium per iron into the material in one hour.

The voltage terminals were defined as from 3.0 to 1.0 V with respect to the reference $Li/Li^+$ electrode. Three charge and discharge cycles were performed, as shown in FIG. 1. Indeed, FIG. 1 is a graph showing the potential of half-cell A as a function of the quantity of inserted lithium expressed as a capacity in relation to the mass of active material of which the electrode is composed (mAh/g).

In this FIG. 1, curve A1 corresponds to the first charge and discharge cycle. Curve A2 corresponds to the second charge and discharge cycle. Curve A3 corresponds to the third charge and discharge cycle.

Consequently, the observation is that the first discharge cycle reaches an irreversible capacity of 200 mAh/g, whereas the following cycles lead to a reversible capacity of 240 mAh/g.

Figure 2:
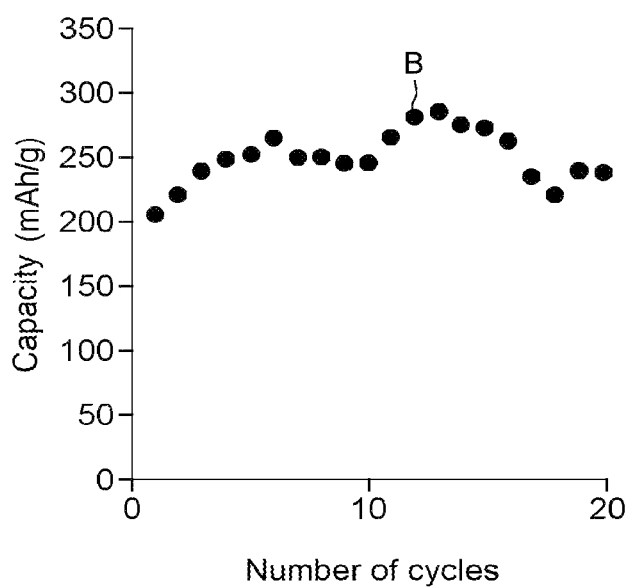
FIG. 2 is a graph showing the capacity of a half cell of a Li-ion battery as a function of the number of cycles.

Furthermore, the capacity of half-cell A according to the invention, as a function of the number of cycles, was also evaluated, as shown by curve B in FIG. 2.

After 20 charge and discharge cycles, the capacity is about 250 mAh/g. Consequently, the capacity of half-cell A according to the invention is much greater than that of a half-cell having a negative electrode comprising the oxide LTO. Indeed, the oxide LTO has a theoretical capacity of 175 mAh/g.

In addition, half-cell A holds up well to cycling.

The average potential determined as the potential at half capacity is 1.7V vs $Li/Li^+$ and is very close to the potential of the oxide LTO.

Consequently, the active material according to the invention makes it possible to obtain an improved capacity.

2. Half-Cell DC-B

Galvanostatic cycling is conducted using a BioLogic cycler with a cycling regimen of C/10, with C corresponding to the current for inserting one lithium per iron into the material in one hour.

Figure 3:
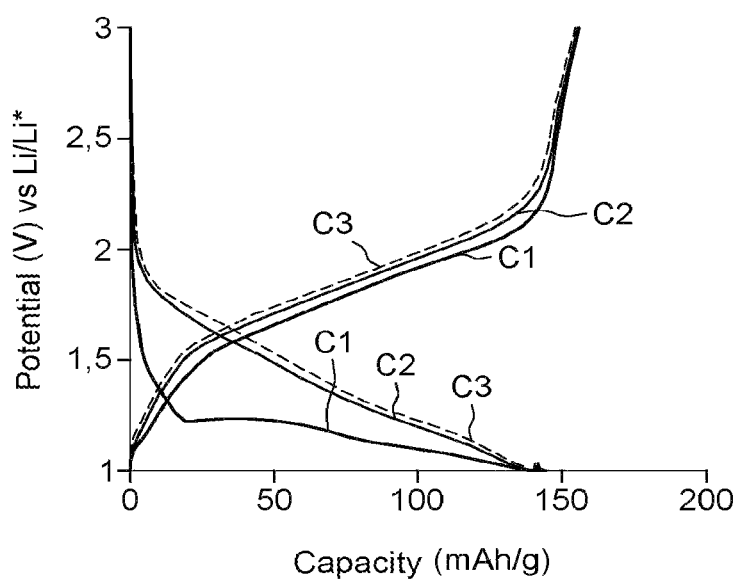
FIG. 3 is a graph showing the potential of a half cell of a Li-ion battery as a function of the quantity of electrochemically inserted lithium, expressed as a capacity.

The voltage terminals were defined as from 3.0 to 1.0 V with respect to the reference $Li/Li^+$ electrode. Three charge and discharge cycles were performed, as shown in FIG. 3. Indeed, FIG. 3 is a graph showing the potential of half-cell B as a function of the capacity.

In this FIG. 3, curve C1 corresponds to the first charge and discharge cycle. Curve C2 corresponds to the second charge and discharge cycle. Curve C3 corresponds to the third charge and discharge cycle.

Consequently, the observation is that the capacity is 140 mAh/g after three cycles.

Consequently, the capacity of half-cell B according to the invention remains high. Indeed, despite the absence of a conductive compound, the capacity loss is only about 45% compared to that of half-cell A.

So the active material according to the invention is a conductive material. In other words, conductivity is improved thanks to the active material of the invention.

The invention claimed is:

1. A negative electrode, comprising:
a negative electrode active material of formula (I):

$$Li_{1-x}OHFe_{1+x}S \qquad (I),$$

wherein x is in a range of from 0.00 to 0.25.

2. The negative electrode of claim 1, wherein, in the negative electrode active material, x is in a range of from 0.05 to 0.20.

3. The negative electrode of claim 1, wherein, in the negative electrode active material, x is 0.05.

4. The negative electrode of claim 1, further comprising:
a conductive compound.

5. The negative electrode of claim 4, wherein the conductive compound comprises metal particles and/or carbon.

6. The negative electrode of claim 4, wherein the conductive compound is carbon.

7. The negative electrode of claim 6, wherein the carbon is in the form of graphite, carbon black, carbon fibers, carbon nanowires, carbon nanotubes, and/or carbon nanospheres.

8. The negative electrode of claim 6, wherein the carbon is carbon black.

9. The negative electrode of claim 4, wherein the conductive compound is present in a range of from 3 to 30 wt. %, relative to total negative electrode weight.

10. The negative electrode of claim 9, wherein the conductive compound is present in a range of from 3 to 20 wt. %.

11. The negative electrode of claim 1, wherein the active material compound is present in a range of from 50 to 97 wt. %, relative to total negative electrode weight.

12. The negative electrode of claim 1, wherein the active material compound is present in a range of from 80 to 97 wt. %, relative to total negative electrode weight.

13. A lithium-ion battery, comprising:
the negative electrode of claim 1.

14. The negative electrode of claim 1, wherein, in the negative electrode active material, x is in a range of from more than 0.00 to no more than 0.25.

15. The negative electrode of claim 1, wherein the negative electrode active material is in the form of plates having lateral dimensions in a range of from 0.5 to 3 µm and/or a thickness in a range of from 90 to 110 nm.

16. A negative electrode comprising a negative electrode active material suitable for a lithium-ion battery, comprising, based on total negative electrode active material weight:
a negative electrode active compound of formula (I) in at least 80 wt. %:

$$Li_{1-x}OHFe_{1+x}S \qquad (I),$$

wherein x is in a range of from 0.00 to 0.25.

17. The negative electrode of claim 16, further comprising:
graphite, carbon black, carbon fibers, carbon nanowires, carbon nanotubes, and/or carbon nanospheres.

18. A method for making the negative electrode of claim 1, the method comprising:
(a) adding iron and sulfur in an aqueous solution of LiOH at a concentration in a range of from 2 to 6 mol/L, to obtain a mixture;
(b) heating the mixture obtained upon completion of the adding (a) to a temperature is in a range of from 130 to 190° C., to obtain an active material;
(c) recovering the negative electrode active material compound; and
(d) combining the negative electrode active material with the negative electrode.

19. The method of claim 18, wherein the concentration is in a range of from 4 to 6 mol/L.

* * * * *